US012612810B2

(12) United States Patent
Hunt

(10) Patent No.: US 12,612,810 B2
(45) Date of Patent: Apr. 28, 2026

(54) MOTOR VEHICLE LOCK—IN PARTICULAR, MOTOR VEHICLE SIDE DOOR LOCK

(71) Applicant: Kiekert AG, Heiligenhaus (DE)

(72) Inventor: Robert J. Hunt, Davisburg, MI (US)

(73) Assignee: Kiekert AG, Heiligenhaus (DE)

(*) Notice: Subject to any disclaimer, the term of this patent is extended or adjusted under 35 U.S.C. 154(b) by 67 days.

(21) Appl. No.: 18/363,951

(22) Filed: Aug. 2, 2023

(65) Prior Publication Data

US 2025/0043600 A1 Feb. 6, 2025

(51) Int. Cl.
*E05B 85/24* (2014.01)
*E05B 85/02* (2014.01)

(52) U.S. Cl.
CPC .............. *E05B 85/24* (2013.01); *E05B 85/02* (2013.01); *E05Y 2201/628* (2013.01); *E05Y 2900/531* (2013.01)

(58) Field of Classification Search
CPC ... E05B 85/24; E05B 85/02; E05Y 2201/628; E05Y 2900/531
USPC .......................................................... 292/194
See application file for complete search history.

(56) References Cited

U.S. PATENT DOCUMENTS 3,130,997 A * 4/1964 Kirk ........................ E05B 85/24 292/341.12
3,316,002 A * 4/1967 Werner ................... E05B 85/24 292/341.17
4,721,406 A * 1/1988 Davis .................... E05D 11/081 384/129
4,756,563 A * 7/1988 Garwood ................ E05B 77/38 292/216
5,746,457 A * 5/1998 Kim .......................... E05C 3/24 292/216
10,370,876 B2 * 8/2019 Farrenkothen .......... E05C 3/124
10,851,565 B1 * 12/2020 Krueger .............. E05B 47/0012
2015/0204114 A1 * 7/2015 Nurmi ...................... E05B 85/26 292/194
2015/0376919 A1 * 12/2015 Yamazaki .......... B60N 2/01583 292/96
2019/0185074 A1 * 6/2019 Morley ................. E05B 85/243
2022/0381071 A1 * 12/2022 Heins ................... B62D 33/037

FOREIGN PATENT DOCUMENTS

DE 102009048222 A1 * 4/2011 ............. E05B 77/10
DE 102006059583 B4 * 6/2014 ............. E05B 79/04
DE 102015004282 A1 10/2016
DE 102017128865 A1 5/2019
(Continued)

*Primary Examiner* — Kristina R Fulton
*Assistant Examiner* — James Edward Ignaczewski
(74) *Attorney, Agent, or Firm* — Renner, Otto, Boisselle & Sklar, LLP

(57) ABSTRACT

A motor vehicle lock, and in particular a motor vehicle side door lock, having a locking mechanism with a rotary latch and at least one pawl, wherein a rotary movement of the rotary latch can be blocked in at least one latching position by means of the pawl; a lock case; and a bearing point, accommodated in the lock case, for at least one locking mechanism part, wherein the motor vehicle lock can be mounted on the motor vehicle by means of the lock case, and wherein the motor vehicle lock can be mounted on the motor vehicle by means of at least one bearing point.

15 Claims, 1 Drawing Sheet

(56) References Cited

FOREIGN PATENT DOCUMENTS

| | | | | | |
|---|---|---|---|---|---|
| DE | 102017128735 | A1 * | 6/2019 | | |
| DE | 202022100135 | U1 | 1/2022 | | |
| EP | 1039079 | A1 * | 9/2000 | ........... | E05B 85/266 |
| EP | 1039079 | B1 | 7/2004 | | |

* cited by examiner

MOTOR VEHICLE LOCK—IN PARTICULAR, MOTOR VEHICLE SIDE DOOR LOCK

FIELD OF DISCLOSURE

The invention relates to a motor vehicle lock, and in particular a motor vehicle side door lock, having a locking mechanism with a rotary latch and at least one pawl, wherein a rotary movement of the rotary latch can be blocked in at least one latching position by means of the pawl; a lock case; and a bearing point, accommodated in the lock case, for at least one locking mechanism part, wherein the motor vehicle lock can be mounted in the motor vehicle by means of the lock case.

BACKGROUND OF DISCLOSURE

High demands relating to function and safety are imposed upon automotive locking systems. Therefore, the locking systems must always function perfectly in everyday life at different temperature conditions and under the influence of dirt. With regard to the safety aspect, it is important here for the locking system to function reliably even in an emergency, i.e., for example, in the event of an accident, and in particular with respect to the locking mechanism. A function must be ensured to the extent that, on the one hand, in the event of an accident, the door remains closed and, on the other, the locking system can be opened after the accident.

In order to withstand these extreme loads and at the same time ensure high functional reliability, locking systems are provided with a lock plate or a lock case. The lock plate and lock case consist of a metal sheet part, and in particular a steel material, and the lock case can extend along the lock housing and form a lock plate or extend over at least two side regions of the lock housing and form a lock case. In the lock plate or the lock case, at least the locking mechanism, consisting of a rotary latch and at least one pawl, is pivotably accommodated in preferably metallic pivot shafts.

In addition to the safety function of the lock case or the lock plate and the tasks of stabilization for bearing the locking system components, the lock case or the lock plate has a further job. By means of the lock case or the lock plate, the locking system is connected to the motor vehicle body. In many cases, the locking system is connected to the motor vehicle via the lock case and in particular via a screw connection with the body—for example, with respect to a side door in the region of the door rabbet. To this end, threads are provided in the lock case, which are usually arranged around the locking mechanism. For further stabilization, the lock case can have additional mounting means, i.e., means for mounting the motor vehicle lock.

A motor vehicle lock equipped with an L-shaped lock case has become known from DE 10 2015 004 282 A1. The motor vehicle door lock has a lock case that is connected to a motor vehicle door, as well as a lock housing that is connected to the lock case, and a fastening element for additionally securing the lock housing to the motor vehicle door. The additional fastening element is in the form of a bracket that can be detachably coupled both to the lock case and to the lock housing. With the aid of this fastening element, the lock housing is additionally fixed to the motor vehicle door. In fact, the bracket is detachably coupled or can be coupled to the lock case and to the lock housing. For this purpose, the bracket has a pin in its lock-case-side end and is inserted into the lock case with the pin. As a result, the lock housing is stiffened with the aid of the bracket—in particular, in the event of an accident.

It has become known from DE 10 2017 128 735 A1 to use threaded sleeves or threaded bushings for further stabilization and in particular for tolerance compensation during assembly of the motor vehicle lock. The threaded bushing is held in a form-fitting manner, but with play in the motor vehicle lock, so that when the motor vehicle lock is screwed to the threaded bushing, play can be compensated for with respect to tolerances in the manufacture of the motor vehicle.

A lock case which has threads integrated into the lock case has become known from the generic prior art of DE 10 2017 128 865 A1. The threads are arranged so as to be distributed over the lock case and are formed directly in recesses in the lock case. In addition, the lock case has mounting openings which serve to receive pivot shafts for locking mechanism parts. To stabilize the lock case, an extension is integrally formed on the lock case, allowing crash safety to be increased.

The solutions known from the prior art have proven themselves in principle and can provide additional safety—in particular, in extreme cases. The more recent developments in the automotive industry and in particular the development of electric vehicles increase the weight of the motor vehicles. In order to deal with these increased weights, which in particular result from the batteries installed in the vehicle, the safety requirements for motor vehicle locking systems are subject to continuous adaptation. Higher weights of the motor vehicles result in higher linear momentum in the event of an accident, which must be absorbed by the locking systems. As already explained above, the locking systems must, on the one hand, counteract the loads in the event of an accident, and, on the other, the stability must be sufficient to ensure the functionality of the locking system even after the accident. The invention addresses these increased requirements and seeks, overall, to provide a remedy.

SUMMARY OF DISCLOSURE

The object of the invention is to provide a lock for a motor vehicle which, for one, meets the increased requirements, achieves this goal with the smallest possible number of components, and which is moreover able to maintain the predetermined manufacturing tolerances.

The object is achieved by the features of independent claim 1. Advantageous embodiments of the invention are specified in the dependent claims. It should be noted that the embodiments described below are not limiting; rather, any possible variations of the features described in the description and the dependent claims are possible.

According to claim 1, the object of the invention is achieved in that a motor vehicle lock, and in particular a motor vehicle side door lock, is provided, having a locking mechanism with a rotary latch and at least one pawl, wherein a rotary movement of the rotary latch can be blocked in at least one latching position by means of the pawl; a lock case; and a bearing point, accommodated in the lock case, for at least one locking mechanism part, wherein the motor vehicle lock can be mounted in the motor vehicle by means of the lock case, and wherein the motor vehicle lock can be mounted on the motor vehicle via the bearing point of at least one locking mechanism part. The design of the motor vehicle lock according to the invention makes it possible to assign a dual function to the bearing point for the locking mechanism part. The bearing point serves on the one hand to accommodate the locking mechanism part and also functions as a fastening means for the motor vehicle lock in the vehicle. As a result of this arrangement, the number of required components in the motor vehicle lock can be reduced, and at the same time it is possible to stabilize the fastening point of the locking mechanism part directly via the fastening means, and in particular a screw. The fastening point of the motor vehicle lock consequently directly forms a bearing point for the locking mechanism part. A significant advantage that results from this is that the tolerance chain between the locking mechanism part and the lock holder cooperating with the locking mechanism part is reduced. A reduction in the tolerance chain offers the advantage of more easily maintaining the predeterminable tolerances between the locking mechanism and lock holder. This is particularly advantageous in that motor vehicle locks have to provide precise functional reliability over a long service life.

When reference is made to a motor vehicle lock in the sense of the invention, this includes motor vehicle locks which are used in, for example, side doors, sliding doors, flaps, hoods, and/or covers, even where pivotably- or slidably-mounted components are arranged on the motor vehicle. It is also conceivable that the motor vehicle lock be arranged in a backrest of a seat.

The motor vehicle lock has a locking mechanism which has a rotary latch and at least one pawl. At least one pawl is preferably arranged in one plane with the rotary latch and is able, in cooperation with a lock holder, to lock the rotary latch in one position. When the locking mechanism is open, an inlet mouth of the rotary latch points towards a lock holder, wherein the rotary latch pivots as a result of a relative movement between the lock holder and the rotary latch. The pawl is usually pre-spring-loaded towards the rotary latch such that the pawl comes into engagement with the rotary latch upon reaching a latching position. Here, a pre-latching position and a main latching position of the locking mechanism can be assumed.

Nearly every motor vehicle lock also has a lock housing in which the locking mechanism, a locking unit, an actuating unit, an electric drive, and/or gearbox parts can be arranged. This list is of course not exhaustive, but merely describes components of the motor vehicle lock that, depending upon the area of application and functionality, may be used. The lock housing is preferably designed as a plastic injection-molded part and can consist of at least one lock housing cover and a lock housing shell. The lock housing is primarily used to protect the functional components from, for example, penetrating moisture and/or dirt. The lock housing components are connected to one another so as to be sealed.

The lock case or the lock plate can be formed as a bent stamped part or stamped part and surrounds the lock housing at least on one side, and, in the case of a lock case, at least on the two sides and at least sectionally. The lock case can enclose an inlet mouth for the lock holder and is thus used to further stabilize the lock. Preferably, the motor vehicle lock and lock plate are connected and screwed to the motor vehicle body. In the case of a lock case, the lock case extends, starting from the lock plate plane of the lock case, preferably at a right angle into a further plane, so that the shape of the lock case can be described as L-shaped.

In the embodiment of the motor vehicle lock according to the invention, a bearing point of a locking mechanism part forms a fastening point for the motor vehicle lock. Preferably, the bearing point has a thread for this purpose. In this embodiment variant of the invention, the number of components required for fastening the motor vehicle lock can be further reduced. The formation of at least one of the bearing points with a thread opens up the possibility of screwing the motor vehicle lock directly to the bearing point. No further components or parts in the interior of the motor vehicle are necessary in order to fasten the motor vehicle lock to the motor vehicle. This reduces the number of components, decreases the effort during manufacture, and therefore has a cost-reducing effect on the motor vehicle lock.

Furthermore, it is conceivable according to the invention to form the bearing point as a separate component. The solutions known from the prior art disclose threads which are formed in the lock case. The use of separate components for forming the bearing point provides a decisive advantage. If the lock case, as a mass-produced component, is preferably manufactured or stamped and/or bent and/or formed from a steel, the use of separate components for the bearing point makes it possible to adapt the material for forming the bearing point to the requirements. In other words, the material for the bearing point can have better friction properties, for example, so that an improved bearing point with the material-specific properties for sliding friction can be provided in the bearing point.

If the bearing point can be non-detachably connected to the lock case, this yields a further embodiment variant of the invention. The bearing point can have, for example, different diameters at least in the external geometry, so that one-sided insertion into the lock case is enabled. If an edge of the bearing point is pushed through the lock case and flanged, i.e., cold-formed, on the opposite side, a non-detachable connection results. As already explained above, the bearing point is preferably formed from a steel material. In this respect, it is possible to produce a non-detachable connection between the bearing point and the lock case by means of shaping, i.e., deformation, of an edge of the bearing point.

A larger diameter formed at the bearing point can simultaneously function as a bearing axis for the locking mechanism part. Due to the non-detachable connection and a corresponding fit while mounting the bearing point in the lock case, a maximum degree of precision in the alignment of the bearing point with respect to the lock case can be achieved. The bearing point forms or can form a bearing point for, for example, a rotary latch. The rotary latch cooperates with a lock holder, wherein the rotary latch can be moved into a pre-latching and/or main latching position by a relative movement between the lock holder and rotary latch.

In the latching position of the rotary latch, the movement of the rotary latch is blocked by the pawl. Blocking the movement of the rotary latch results in the lock holder being securely held in the rotary latch. Safe movement of the motor vehicle can therefore be achieved with a closed locking mechanism. The center point of the lock holder with respect to the motor vehicle lock is referred to as the S-point. Starting from the S-point, i.e., from a central axis of the lock holder, tolerances can be pre-specifiable with respect to the motor vehicle lock. In other words, the cooperation between the lock holder—preferably arranged on the motor vehicle—and the motor vehicle lock—preferably arranged in the movable component on the motor vehicle—is subject to a tolerance. This tolerance between the S-point and the pivot shaft of the rotary latch must be maintained in order to be able to adjust or maintain exact positioning of the movable component with respect to the motor vehicle. The direct fastening of the rotary latch to the fastening point of the motor vehicle lock minimizes the tolerance chain between the lock holder and the locking mechanism. The fastening point, i.e., the screw-on point on the body, is predefined by the body or the movable component. Due to the direct bearing of the rotary latch, only the manufacturing tolerance of the bearing point, the rotary latch, and the lock holder come into consideration.

It can be additionally advantageous and form an embodiment variant of the invention if the bearing point can be formed as a threaded bushing, wherein the locking mechanism part can be mounted directly on the threaded bushing. A bearing bushing is characterized in that the bearing bushing directly provides a sliding surface for the movable locking mechanism part. In addition, the bearing bushing according to the invention has a thread, and preferably a metric thread, in the region of the inner opening. In other words, the bearing bushing forms a bearing point for the locking mechanism part, serves to fasten the motor vehicle lock to the body, and at the same time, because of the thread, supplies a fastening region for the use of a screw. Metric threads are preferably to be used, since they are available in many versions and therefore economical. Of course, it is also conceivable that the bushing on the contact surface of the locking mechanism part have a coating, which provides improved sliding properties for the rotary latch, for example.

If a reinforcement plate can be provided in the motor vehicle lock, and if the bearing location can be accommodated in the reinforcement plate, a further embodiment variant of the invention results. The reinforcement plate, overall, stabilizes the locking mechanism as well as the motor vehicle lock. The reinforcement plate is oriented to be substantially parallel to the lock case and the locking mechanism part plane, and held in the motor vehicle lock. The reinforcement plate can be held by one or more bearing points or bearing bushings. It is also conceivable for a first bearing bushing to be accommodated between the lock case and the reinforcement plate, for a second bearing point, for example, to bear the rotary latch and be arranged between the lock case and the reinforcement plate, and for the reinforcement plate to be fastened to a third receiving point in a locking mechanism part shaft, e.g., a pawl shaft, in the motor vehicle lock. Therefore, a combination of a bearing bushing and fastening on a locking mechanism part shaft is also conceivable according to the invention. The reinforcement plate and lock case are preferably made of steel and are designed as a stamped or stamped bent part.

If the bearing point can be non-detachably connected to the reinforcement plate, another embodiment variant of the invention results. The bearing point, which can in particular be a bearing bushing, can preferably be formed with different diameters. Particularly in the middle part, the bearing bushing can have a larger diameter and a greater wall thickness. The greater wall thickness is required in particular for sufficient strength and for providing a suitable material for introducing the thread. Starting from the thicker wall region in the central part of the bearing bushing, a shoulder can be provided at the ends of the bearing bushing, which shoulder is formed, in an extension, as a collar with a smaller wall thickness, but a uniform inner diameter. The collar and the resulting shoulder can then be used as the contact surface on the lock case and on the reinforcement plate. The collar has a smaller wall thickness so the collar can be reshaped by a forming operation, such as cold upsetting, and can be non-detachably connected to the lock case and the reinforcement plate. By forming a corresponding fit between collar, lock case, and reinforcement plate, a very precise positioning of the bearing bushing in the motor vehicle lock can be realized.

According to the invention, it is also conceivable that the reinforcement plate be able to be used with the lock case via at least one further threaded bushing. As already shown in an exemplary embodiment, the bearing point serves on the one hand to receive at least one locking mechanism part and, on the other, the bearing point can also serve exclusively as a fastening point for the motor vehicle lock. It is also conceivable that another actuating element, such as an actuating lever, be able to be mounted on the bearing point next to the rotary latch, in order to be able to provide a minimum number of components for realizing the lock functionalities.

With regard to an appropriate design of the material properties and material thicknesses, it has been shown that the lock case should have a thickness of 2-3 mm, and preferably 2.5 mm, whereas the reinforcement plate should have a thickness of 1.5 mm to 2.5 mm, and preferably 2 mm. The combination of different material thicknesses can cause an additional stabilization of the motor vehicle lock overall. In particular, the preferred embodiment variant of a lock case with a thickness of 2.5 mm and a reinforcement plate with a thickness of 2 mm have shown that the increased crash safety requirements can be met. This significantly increases the restraining forces that can be absorbed by the vehicle, such that forces of up to 35 kN can be absorbed in the locking mechanism. These specifications can be achieved and exceeded by the suitable selection of material and in particular the preferred material thicknesses.

With respect to the bearing points, it has been found to be advantageous and necessary that metric threads of a size of 6-12 mm, preferably 8 mm, and even more preferably 10 mm are advantageous. In particular, the preferred embodiment variant with a metric thread of 10 mm has produced a sufficient strength, which exceeds the requirements, with respect to the strength of the motor vehicle lock.

The design of the motor vehicle lock according to the invention allows manufacturing tolerances to be maintained—particularly with regard to the S-point—while at the same time meeting the increased load requirements. Tolerances and loads can be maintained, wherein, moreover, the full functionality of the motor vehicle lock can be provided with a minimum number of components.

BRIEF DESCRIPTION OF DRAWINGS

The invention is explained in more detail below with reference to the accompanying drawings on the basis of a preferred embodiment. However, the principle applies that the exemplary embodiment does not restrict the invention, but merely represents an exemplary embodiment of the invention. The features shown can be implemented individually or in combination with further features of the description as well as the claims—individually or in combination.

In the figures.

DETAILED DESCRIPTION

Figure 1:
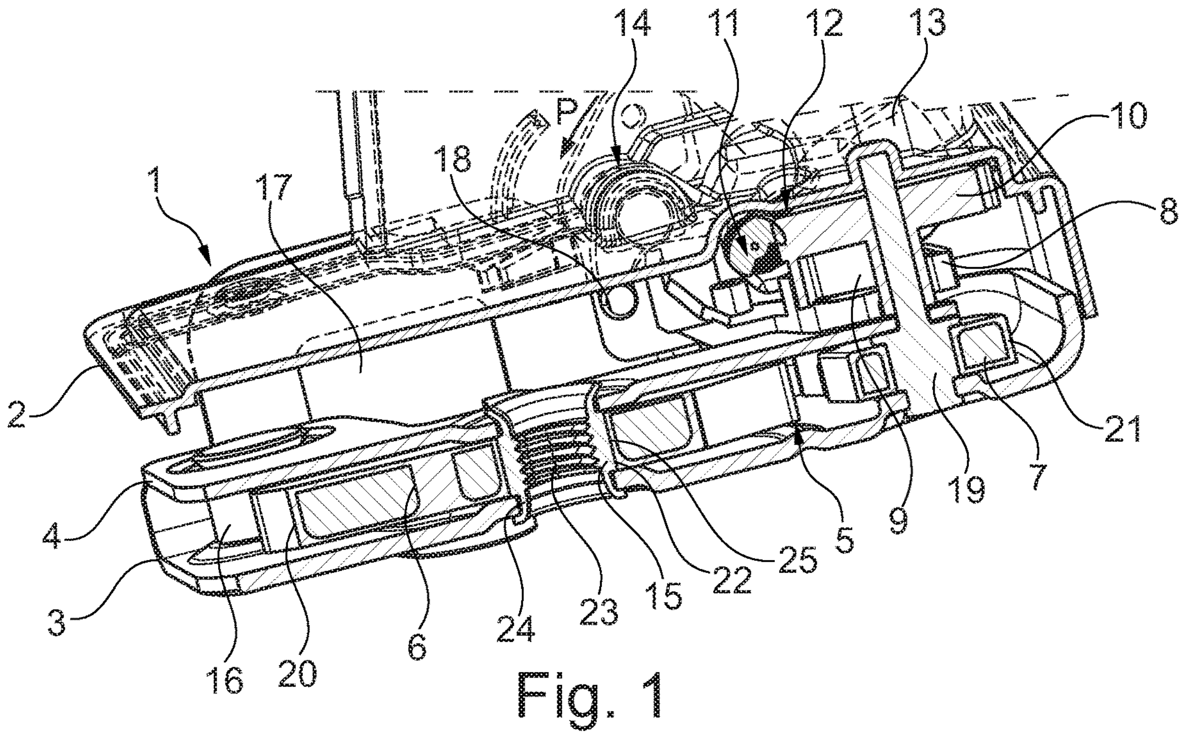
FIG. 1 shows a three-dimensional view of a motor vehicle lock designed according to the invention, with a section through a bearing point, wherein the bearing point acts as a bearing bushing for a rotary latch.

The threaded bushing 15 shown in FIG. 1 has a shoulder 22 which results from a larger diameter of the threaded bushing 15. The bearing point 15 is consequently provided with different diameters. In the interior of the bearing point 15, a thread is shown which serves in this exemplary embodiment to accommodate a metric screw with a thread M10. Furthermore, a collar 24 can be seen in FIG. 1, wherein the collar is formed on both sides of the bearing point 15. By forming the collar 24, the bearing point 15, 16 can be non-detachably connected to the lock case 3 and also to the reinforcement plate 4. A running surface 25 for the rotary latch 6 is formed on an outer surface of the bearing point 15. The bearing point 15 therefore serves as a fastening means for the motor vehicle lock, for stabilizing the lock by the connection of the lock case 3 and the reinforcement plate 4, and additionally as a bearing bushing 15 for the locking mechanism part 6.

As can be seen from the exemplary embodiment, the threaded bushing 15, 16 can serve exclusively for stabilizing the overall lock and for fastening the motor vehicle lock in the motor vehicle, but the threaded bushing can also form a bearing point 15 for a locking mechanism part. It can be seen in this exemplary embodiment that the reinforcement plate 4 is held by the threaded sleeves 15, 16 and the shaft 19 in the motor vehicle lock 1, and can serve overall for stabilizing the motor vehicle lock 1.

Figure 2:
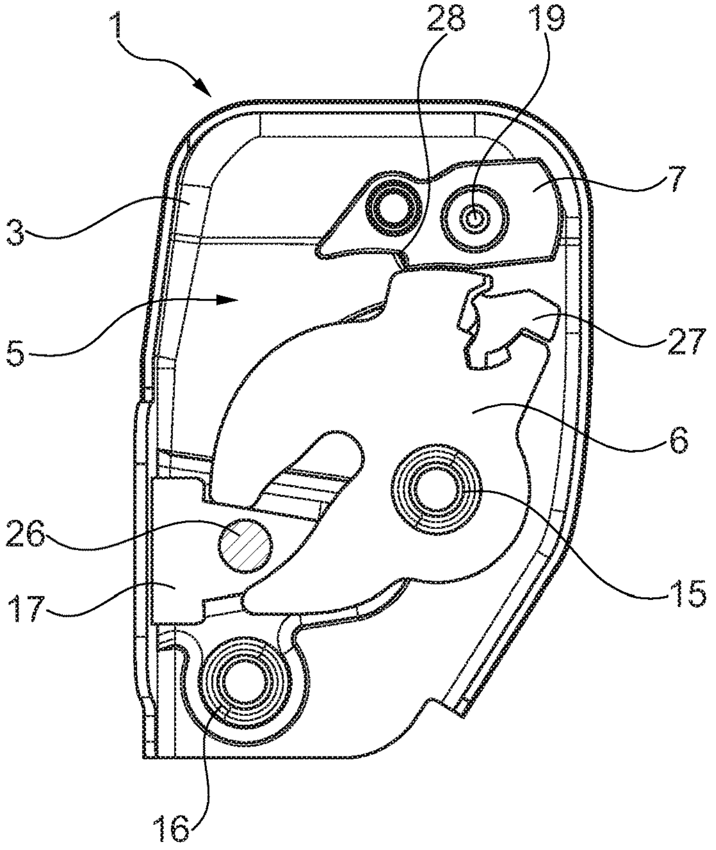
FIG. 2 shows a plan view of the locking mechanism according to FIG. 1, wherein only the components of the motor vehicle lock that are relevant for explaining the invention are shown.

FIG. 2 shows a plan view of the locking mechanism 5 of the motor vehicle lock 1. It can be seen that the threaded sleeves 15, 16 serve on the one hand for fastening the motor vehicle lock 1 to the motor vehicle, and, on the other, the threaded bushing 15 acts as a bearing point 15 for the rotary latch. This can in particular produce a precise alignment of the rotary latch 6 with respect to a lock holder 26. The locking mechanism 5 is shown in an open position, wherein the lock holder 26 transfers the rotary latch 6 to a latching position by a relative movement between the motor vehicle lock 1 and the lock holder 26 so that the latching element 27 engages with a latching surface 28 on the pawl 7. Due to the multi-functionality of the bearing point 15, the structure of the motor vehicle lock 1 can be significantly reduced, and high tolerance specifications can be maintained reliably and with long-term stability.

| List of reference signs | |
|---|---|
| 1 | Motor vehicle lock |
| 2 | Lock housing |
| 3 | Lock case |
| 4 | Reinforcement plate |
| 5 | Locking mechanism |
| 6 | Rotary latch |
| 7 | Pawl |
| 8 | Release lever |
| 9 | Actuating lever |
| 10 | Worm gear |
| 11 | Worm |
| 12 | Worm gearbox |
| 13 | Drive |
| 14 | Internal or external actuating lever |
| 15, 16 | Threaded bushing, bearing point |
| 17 | Inlet mouth |
| 18 | Actuating arm |
| 19 | Shaft |
| 20, 21 | Plastic cover |
| 22 | Shoulder |
| 23 | Thread |
| 24 | Collar |
| 25 | Running surface |
| 26 | Lock holder |
| 27 | Latching element |
| 28 | Latching surface |
| P | Arrow |

The invention claimed is:

1. A motor vehicle lock comprising:

a locking mechanism with a rotary latch and at least one pawl, wherein a rotary movement of the rotary latch is blocked in at least one latching position by the pawl;

a lock case;

a bearing point accommodated on the lock case for at least one component of the locking mechanism, wherein the motor vehicle lock is mounted on the motor vehicle by the lock case, and wherein the motor vehicle lock also is mounted on the motor vehicle by the bearing point of the at least one component of the locking mechanism; and a reinforcement plate, wherein the bearing point is further accommodated in the reinforcement plate such that the at least one component of the locking mechanism is arranged on the bearing point between the lock case and the reinforcement plate, wherein the reinforcement plate is further connected to the lock case via at least one further bearing point separate from the bearing point, wherein the bearing point has a differing external diameter with a central portion with a first external diameter and an end portion with a second external diameter smaller than the first diameter forming a shoulder that engages the lock case, and wherein an edge of the bearing point is flanged radially outwardly to form a collar such that the lock case is held between the shoulder and the collar of the bearing point.

2. The motor vehicle lock according to claim 1, wherein the bearing point has a thread.

3. The motor vehicle lock according to claim 1, wherein the bearing point is a separate component from the lock case.

4. The motor vehicle lock according to claim 1, wherein the bearing point is non-detachably connected to the lock case.

5. The motor vehicle lock according to claim 1, wherein the bearing point is a threaded bushing that provides a sliding surface for the component of the locking mechanism, and wherein the component of the locking mechanism is mounted directly on the threaded bushing.

6. The motor vehicle lock according to claim 1, wherein the bearing point is non-detachably connected to the reinforcement plate.

7. The motor vehicle lock according to claim 1, wherein the at least one further bearing point is a threaded bushing.

8. The motor vehicle lock according to claim 1, wherein the lock case has a thickness of 2 mm to 3 mm, and the reinforcement plate has a thickness of 1.5 mm to 2.5.

9. The motor vehicle lock according to claim 1, wherein a metric thread having a size of 6 mm to 12 mm is contained in the bearing point.

10. The motor vehicle lock according to claim 1, wherein the lock case has a thickness of 2.5 mm, and the reinforcement plate has a thickness of 2 mm.

11. The motor vehicle lock according to claim 1, wherein a metric thread having a size of 8 mm is contained in the bearing point.

12. The motor vehicle lock according to claim 1, wherein a metric thread having a size of 10 mm is contained in the bearing point.

13. The motor vehicle lock according to claim 1, wherein the bearing point includes a steel material.

14. The motor vehicle lock according to claim 1, wherein the bearing point is a bearing point for the rotary latch.

15. The motor vehicle lock according to claim 5, wherein the threaded bushing has a middle part and a shoulder at ends of the threaded bushing, and in the middle part the threaded bushing has a larger diameter and a greater wall thickness relative to the ends.

* * * * *